United States Patent [19]
Wang et al.

[11] Patent Number: 6,017,980
[45] Date of Patent: Jan. 25, 2000

[54] ELASTOMERIC COMPOUNDS INCORPORATING METAL-TREATED CARBON BLACKS

[75] Inventors: Meng-Jiao Wang, Lexington; Khaled Mahmud, Tyngsboro, both of Mass.

[73] Assignee: Cabot Corporation, Boston, Mass.

[21] Appl. No.: 08/828,785

[22] Filed: Mar. 27, 1997

[51] Int. Cl.[7] .................................................. C08K 3/00
[52] U.S. Cl. .......................... 523/215; 523/216; 524/495; 524/496
[58] Field of Search .................................. 523/215, 216; 524/495, 496

[56] References Cited

U.S. PATENT DOCUMENTS

| | | | |
|---|---|---|---|
| T860,001 | 3/1969 | Gessler . | |
| 1,999,573 | 4/1935 | O'Dell | 134/60 |
| 2,121,535 | 6/1938 | Amon | 106/475 |
| 2,375,795 | 5/1945 | Krejci | 23/209.8 |
| 2,439,442 | 4/1948 | Amon et al. | 23/209.1 |
| 2,564,700 | 8/1951 | Krejci | 23/209.4 |
| 2,632,713 | 3/1953 | Krejci | 106/307 |
| 2,793,100 | 5/1957 | Weihe | 423/460 |
| 2,867,540 | 1/1959 | Harris | 106/476 |
| 3,011,902 | 12/1961 | Jordon | 106/30 R |
| 3,025,259 | 3/1962 | Watson et al. | 106/476 |
| 3,094,428 | 6/1963 | Hamilton et al. | 106/307 |
| 3,188,225 | 6/1965 | Walker | 106/291 |
| 3,203,819 | 8/1965 | Steenken et al. | 106/307 |
| 3,290,165 | 12/1966 | Iannicelli | 106/308 |
| 3,317,458 | 5/1967 | Clas et al. | 260/41.5 |
| 3,335,020 | 8/1967 | Aboytes et al. | 106/476 |
| 3,390,006 | 6/1968 | Takewell et al. | 106/475 |
| 3,423,391 | 1/1969 | Kindler et al. | 106/20 R |
| 3,494,740 | 2/1970 | Speck | 23/209.4 |
| 3,528,840 | 9/1970 | Aboytes | 106/473 |
| 3,622,650 | 11/1971 | Berstein et al. | 260/763 |
| 3,660,132 | 5/1972 | Illigen et al. | 106/307 |
| 3,663,285 | 5/1972 | Graf et al. | 106/308 |
| 3,671,476 | 6/1972 | Terai et al. | 260/23 |
| 3,686,111 | 8/1972 | Makhloaf et al. | 524/530 |
| 3,689,452 | 9/1972 | Burke, Jr. | 260/33.6 |
| 3,716,513 | 2/1973 | Burke, Jr. | 260/33.6 |
| 3,997,356 | 12/1976 | Thurn et al. | 106/288 |
| 4,006,031 | 2/1977 | Ferch et al. | 106/473 |
| 4,014,844 | 3/1977 | Vidal et al. | 106/472 |
| 4,108,679 | 8/1978 | Szczepanik et al. | 106/307 |
| 4,211,578 | 7/1980 | Scott, IV | 106/475 |
| 4,213,957 | 7/1980 | Hunt et al. | 423/450 |
| 4,221,693 | 9/1980 | Getson et al. | 260/37 |
| 4,265,768 | 5/1981 | Beasley et al. | 210/682 |
| 4,297,145 | 10/1981 | Wolff et al. | 106/308 |
| 4,320,011 | 3/1982 | Sato et al. | 210/694 |
| 4,366,139 | 12/1982 | Kühner et al. | 423/449 |
| 4,452,638 | 6/1984 | Gallus | 106/97 |
| 4,530,961 | 7/1985 | Nguyen et al. | 106/20 R |
| 4,537,633 | 8/1985 | Hong | 106/96 |
| 4,590,052 | 5/1986 | Chevallier et al. | 423/335 |
| 4,597,794 | 7/1986 | Ohta et al. | 106/20 C |
| 4,670,059 | 6/1987 | Hackleman et al. | 106/475 |

(List continued on next page.)

FOREIGN PATENT DOCUMENTS

| | | |
|---|---|---|
| 0 006 190 A1 | 1/1980 | European Pat. Off. . |
| 0 278 743 | 8/1988 | European Pat. Off. . |
| 0 287 138 | 10/1988 | European Pat. Off. . |
| 0 468 140 A2 | 1/1992 | European Pat. Off. . |
| 0 475 075 A1 | 3/1992 | European Pat. Off. . |
| 0 050 354 | 4/1992 | European Pat. Off. . |
| 675 175 | 10/1995 | European Pat. Off. . |
| 0 735 088 A1 | 2/1996 | European Pat. Off. . |
| 0 711 805 A1 | 5/1996 | European Pat. Off. . |
| 0 799 854 A1 | 10/1997 | European Pat. Off. . |
| 0 799 867 A1 | 10/1997 | European Pat. Off. . |
| E 72775 | 4/1960 | France . |
| 1230893 | 9/1960 | France . |
| 1331889 | 5/1963 | France . |
| 1 459 019 | 11/1966 | France . |
| 1 499 348 | 10/1967 | France . |
| 1 948 443 | 4/1971 | Germany . |
| 2 355 758 | 5/1975 | Germany . |
| 3 502 494 | 8/1985 | Germany . |
| 3541238 | 11/1985 | Germany . |
| 3 813 678 A1 | 11/1988 | Germany . |
| 3916981 A1 | 12/1989 | Germany . |
| 909 255 | 7/1992 | Germany . |
| 4208583 | 9/1992 | Germany . |
| 195 20 946 A1 | 12/1996 | Germany . |
| 5132307 | of 0000 | Japan . |
| 56-078629 | 6/1981 | Japan . |
| 59/82467 | 5/1984 | Japan . |
| 59-207872 | 11/1984 | Japan . |
| 8073657 | 2/1985 | Japan . |
| 62-250073 | 10/1987 | Japan . |
| 63-190800 | 8/1988 | Japan . |
| 63-291900 | 11/1988 | Japan . |
| 1073245 | 3/1989 | Japan . |
| 4031399 | 2/1992 | Japan . |
| 4039814 | 2/1992 | Japan . |
| 4-182400 | 6/1992 | Japan . |
| 4-198098 | 7/1992 | Japan . |

(List continued on next page.)

OTHER PUBLICATIONS

Derwent Abstract, AN No. 80–03330C, "Sulphonated Carbon Pigment Production by Treating Technical Grade Carbon with Hot Aqueous Acid," SU,A,659, 523, Apr. 1979.

Derwent Abstract, AN No. 82–28019E, "Penetrating Flexographic Print Ink Based Polyacrylic Resin," Oct. 17, 1979, SU,A, 834062.

*Primary Examiner*—Edward J. Cain

[57] ABSTRACT

Disclosed are elastomeric compounds including an elastomer and an aggregate comprising a carbon phase and a metal-containing species phase, optionally including a coupling agent. Also disclosed is an aggregate comprising a carbon phase and a metal-containing species phase. A variety of elastomers and formulations employing such elastomers are contemplated and disclosed. Elastomeric compounds incorporating an elastomer and the aggregate are also disclosed. Also disclosed are methods for preparing elastomers compounded with the aggregate.

34 Claims, 2 Drawing Sheets

U.S. PATENT DOCUMENTS

| | | | |
|---|---|---|---|
| 4,751,204 | 6/1988 | Kyoden et al. | 501/89 |
| 4,820,751 | 4/1989 | Takeshita et al. | 523/215 |
| 4,831,011 | 5/1989 | Oikawa et al. | 502/406 |
| 4,929,391 | 5/1990 | Kroupa | 252/511 |
| 4,976,945 | 12/1990 | Kanamura et al. | 423/450 |
| 5,130,363 | 7/1992 | Scholl et al. | 524/392 |
| 5,149,732 | 9/1992 | Igarashi et al. | 524/426 |
| 5,159,009 | 10/1992 | Wolff et al. | 106/475 |
| 5,184,148 | 2/1993 | Suga et al. | 106/20 R |
| 5,190,582 | 3/1993 | Shinozuka et al. | 106/20 D |
| 5,227,425 | 7/1993 | Rauline | 524/493 |
| 5,281,261 | 1/1994 | Lin | 106/20 R |
| 5,282,887 | 2/1994 | Gay et al. | 106/261 |
| 5,286,291 | 2/1994 | Bernhardt et al. | 106/475 |
| 5,294,253 | 3/1994 | Carlson et al. | 106/475 |
| 5,328,949 | 7/1994 | Sandstrom et al. | 524/262 |
| 5,336,730 | 8/1994 | Sandstrom et al. | 524/492 |
| 5,401,313 | 3/1995 | Supplee et al. | 106/475 |
| 5,401,789 | 3/1995 | Wolff et al. | 523/213 |
| 5,430,087 | 7/1995 | Carlson et al. | 106/475 |
| 5,502,146 | 3/1996 | Inoue et al. | 528/34 |
| 5,554,739 | 9/1996 | Belmont | 534/885 |
| 5,559,169 | 9/1996 | Belmont et al. | 523/215 |
| 5,571,311 | 11/1996 | Belmont et al. | 106/20 R |
| 5,575,845 | 11/1996 | Belmont et al. | 106/712 |
| 5,580,919 | 12/1996 | Agostini et al. | 524/430 |
| 5,622,557 | 4/1997 | Mahmud et al. | 106/712 |
| 5,630,868 | 5/1997 | Belmont et al. | 106/31.75 |
| 5,654,357 | 8/1997 | Menashi et al. | 524/495 |
| 5,672,198 | 9/1997 | Belmont | 106/20 |
| 5,679,728 | 10/1997 | Kawazura | 523/216 |
| 5,698,016 | 12/1997 | Adams et al. | 106/31.6 |
| 5,707,432 | 1/1998 | Adams et al. | 106/31.6 |
| 5,713,988 | 2/1998 | Belmont et al. | 106/31.6 |

FOREIGN PATENT DOCUMENTS

| | | | |
|---|---|---|---|
| 4-198100 | 7/1992 | Japan . | |
| 4-270199 | 9/1992 | Japan . | |
| 4-276000 | 10/1992 | Japan . | |
| 4362009 | 12/1992 | Japan . | |
| 60-055000 | 12/1992 | Japan . | |
| 5-043817 | 2/1993 | Japan . | |
| 5105600 | 4/1993 | Japan . | |
| 5-178604 | 7/1993 | Japan . | |
| 5-182517 | 7/1993 | Japan . | |
| 5-222245 | 8/1993 | Japan . | |
| 6067421 | 3/1994 | Japan . | |
| 0 862 018 | 3/1961 | United Kingdom . | |
| 1139620 | 1/1969 | United Kingdom | 106/475 |
| 1191872 | 5/1970 | United Kingdom . | |
| 1213186 | 11/1970 | United Kingdom . | |
| 1363428 | 8/1974 | United Kingdom . | |
| 1363429 | 8/1974 | United Kingdom . | |
| 2044741 | 10/1980 | United Kingdom . | |
| 2 098 972 | 5/1982 | United Kingdom . | |
| 2 188 311 | 9/1987 | United Kingdom . | |
| 2 296 915 | 7/1996 | United Kingdom . | |
| WO 91/02034 | 8/1990 | WIPO . | |
| WO 91/15425 | 1/1991 | WIPO . | |
| WO 92/13983 | 8/1992 | WIPO . | |
| WO 95/01838 | 1/1995 | WIPO . | |
| WO 96/18688 | 6/1996 | WIPO . | |
| WO 96/18689 | 6/1996 | WIPO . | |
| WO 96/18694 | 6/1996 | WIPO . | |
| WO 96/18695 | 6/1996 | WIPO . | |
| WO 96/18696 | 6/1996 | WIPO . | |
| WO 96/37546 | 11/1996 | WIPO . | |
| WO 96/37547 | 11/1996 | WIPO . | |
| 96/14583 | 2/1997 | WIPO . | |
| WO 97/10291 | 3/1997 | WIPO . | |
| 97/08049 | 5/1997 | WIPO . | |
| 97/08854 | 11/1997 | WIPO . | |
| 97/17134 | 1/1998 | WIPO . | |

OTHER PUBLICATIONS

Derwent Abstract, AN No. 86–335147, "Wear Resistant Rubber Composition for Tire Tread Rubber," Apr. 30, 1985, JPA 61–250042, Nov. 1986.

Derwent Abstract, AN No. 88–116672 "Surface Treatment of Carbon Black for Powder Coating . . . ," Mar. 22, 1988, JPA 86 0208468.

Derwent Abstract, AN No. 93–261471, "Carbon Black for Coating Magnetic Recording Media—Having Silicon Dioxide Coating, Giving Good Dispersibility, Lubrication, etc.", Japanese Patent Application No. 5178604, Jul. 20, 1993.

Derwent Abstract, AN No. 95–183086, "Tire Treated Rubber Composition," Oct. 21, 1993, JPA 07102116.

Derwent Abstract, AN No. 94–189154, "Ink for Writing Implements," May 10, 1994, JPA 61–28517A.

Patent Abstracts of Japan Publication No. JP7102116, "Rubber Composition for Tire Tread," Apr. 18, 1995.

Moschopedis, et al., "The Reaction of Diazonium Salts with Humic Acids and Coals: Evidence for Activated Methylene Bridges in Coals and Humic Acids," *Fuel,* vol. 43, No. 4, pp. 289–298, 1964, no month.

Roberts et al., *Basic Principles of Organic Chemistry,* Second Edition, W.A. Benjamin, Inc., Pub., p. 1080, no date available.

Zoheidi et al., "Role of Oxygen Surface Groups in Catalysis of Hydrogasification of Carbon Black by Potassium Carbonate," *Carbon,* vol. 25, No. 6, pp. 809–819, 1987, no month available.

Delamar et al., J. Am. Chem. Soc. 1992, 114, 5883–5884, no month available.

Concise Encyclopedia of Polymer Science and Engineering, Wiley, 1990, pp. 104–105.

Carbon (Carbon Black) reprinted from Kirk–Othmer: Encyclopedia of Chemical Technology, vol. 4, Third Edition, pp. 631–643, 1978.

International Search Report dated Aug. 3, 1998, for PCT/US/06305 filed Mar. 27, 1998.

ELASTOMERIC COMPOUNDS INCORPORATING METAL-TREATED CARBON BLACKS

FIELD OF THE INVENTION

The present invention relates to novel aggregates and elastomeric compounds. More particularly, the present invention relates to metal-containing carbon blacks and elastomeric compounds incorporating metal-containing carbon blacks, such as aluminum-treated or zinc-treated carbon blacks, and products manufactured from such compounds.

BACKGROUND OF THE INVENTION

Carbon blacks are widely used as pigments, fillers and reinforcing agents in the compounding and preparation of rubber and other elastomeric compounds. Carbon blacks are particularly useful as reinforcing agents in the preparation of elastomeric compounds used in the manufacture of tires.

Carbon blacks are generally produced in a furnace-type reactor by pyrolyzing a hydrocarbon feedstock with hot combustion gases to produce combustion products containing particulate carbon black. Carbon black exists in the form of aggregates. The aggregates, in turn are formed of carbon black particles. However, carbon black particles do not generally exist independently of the carbon black aggregate. Carbon blacks are generally characterized on the basis of analytical properties, including, but not limited to particle size and specific surface area; aggregate size, shape, and distribution; and chemical and physical properties of the surface. The properties of carbon blacks are analytically determined by tests known to the art. For example, nitrogen adsorption surface area (measured by ASTM test procedure D3037-Method A) and cetyl-trimethyl ammonium bromide adsorption value (CTAB) (measured by ASTM test procedure D3765 [09.01]), are measures of specific surface area. Dibutylphthalate absorption of the crushed (CDBP) (measured by ASTM test procedure D3493-86) and uncrushed (DBP) carbon black (measured by ASTM test procedure D2414-93), relates to the aggregate structure. The bound rubber value relates to the surface activity of the carbon black. The properties of a given carbon black depend upon the conditions of manufacture and may be modified, e.g., by altering temperature, pressure, feedstock, residence time, quench temperature, throughput, and other parameters.

It is generally desirable in the production of tires to employ carbon black-containing compounds when constructing the tread and other portions of the tire. For example, a suitable tread compound will employ an elastomer compounded to provide high abrasion resistance and good hysteresis balance at different temperatures. A tire having high abrasion resistance is desirable because abrasion resistance is proportional to tire life. The physical properties of the carbon black directly influence the abrasion resistance and hysteresis of the tread compound. Generally, a carbon black with a high surface area and small particle size will impart a high abrasion resistance and high hysteresis to the tread compound. Carbon black loading also affects the abrasion resistance of the elastomeric compounds. Abrasion resistance increases with increased loading, at least to an optimum point, beyond which abrasion resistance actually decreases.

The hysteresis of an elastomeric compound relates to the energy dissipated under cyclic deformation. In other words, the hysteresis of an elastomeric composition relates to the difference between the energy applied to deform the elastomeric composition and the energy released as the elastomeric composition recovers to its initial undeformed state. Hysteresis is characterized by a loss tangent, tan $\delta$, which is a ratio of the loss modulus to the storage modulus (that is, viscous modulus to elastic modulus). Tires made with a tire tread compound having a lower hysteresis measured at higher temperatures, such as 40° C. or higher, will have reduced rolling resistance, which in turn, results in reduced fuel consumption by the vehicle using the tire. At the same time, a tire tread with a higher hysteresis value measured at low temperature, such as 0° C. or lower, will result in a tire with high wet traction and skid resistance which will increase driving safety. Thus, a tire tread compound demonstrating low hysteresis at high temperatures and high hysteresis at low temperatures can be said to have a good hysteresis balance.

There are many other applications where it is useful to provide an elastomer exhibiting a good hysteresis balance but where the abrasion resistance is not an important factor. Such applications include but are not limited to tire components such as undertread, wedge compounds, sidewall, carcass, apex, bead filler and wire skim; engine mounts; and base compounds used in industrial drive and automotive belts.

Silica is also used as a reinforcing agent (or filler) for elastomers. However, using silica alone as a reinforcing agent for elastomer leads to poor performance compared to the results obtained with carbon black alone as the reinforcing agent. It is theorized that strong filler-filler interaction and poor filler-elastomer interaction accounts for the poor performance of silica. The silica-elastomer interaction can be improved by chemically bonding the two with a chemical coupling agent, such as bis(3-triethoxysilylpropyl)tetrasulfane, commercially available as Si-69 from Degussa AG, Germany. Coupling agents such as Si-69 create a chemical linkage between the elastomer and the silica, thereby coupling the silica to the elastomer.

When the silica is chemically coupled to the elastomer, certain performance characteristics of the resulting elastomeric composition are enhanced. When incorporated into vehicle tires, such elastomeric compounds provide improved hysteresis balance. However, elastomer compounds containing silica as the primary reinforcing agent exhibit low thermal conductivity, high electrical resistivity, high density and poor processability.

When carbon black alone is used as a reinforcing agent in elastomeric compositions, it does not chemically couple to the elastomer but the carbon black surface provides many sites for interacting with the elastomer. While the use of a coupling agent with carbon black might provide some improvement in performance to an elastomeric composition, the improvement is not comparable to that obtained when using a coupling agent with silica.

It has been established that the hysteresis of filled compounds is mainly related to the filler network formed in the polymer matrix which causes high hysteresis at high temperature and low hysteresis at low temperature. This is undesirable for tire applications. The main factor to control filler networking is the filler-filler interaction.

SUMMARY OF THE INVENTION

It is an object of the present invention to provide filler compounds which can be incorporated into elastomeric compounds. Particularly, it is an object to provide an elastomeric compound incorporating metal-treated carbon blacks, such as aluminum-treated or zinc-treated carbon blacks. It is yet another object of the present invention to provide an elastomeric compound incorporating metal-treated carbon blacks, wherein the carbon black may be efficiently coupled to the elastomer with a coupling agent. Such a carbon black may be employed for example, in tire compounds, industrial rubber products and other rubber goods. It is a further object of the present invention to provide metal-treated carbon black/elastomeric formulations using a variety of elastomers useful in a variety of product applications.

Additional features and advantages of the present invention will be set forth in part in the description which follows, and in part will be apparent from the description, or may be learned by the practice of the present invention. The objectives and other advantages of the present invention may be realized and obtained by means of the elements and combinations particularly pointed out in the written description and the claims.

To achieve these and other advantages, and in accordance with the purpose of the present invention, as embodied and broadly described herein, the present invention relates to metal-treated carbon blacks which are aggregates containing at least a carbon phase and a metal-containing species phase. The present invention is also directed to an elastomeric compound including an elastomer and a metal-treated carbon black, and optionally including a coupling agent. A variety of elastomers and formulations employing such elastomers are contemplated and disclosed. Elastomeric compounds incorporating an elastomer and a metal-treated carbon black are also disclosed. Also disclosed are methods for preparing elastomeric compounds with the metal-treated carbon blacks and products manufactured from such compounds.

DETAILED DESCRIPTION OF THE INVENTION

The present invention relates to metal-treated carbon blacks. These metal-treated carbon blacks can be incorporated into elastomeric compounds for a variety of uses, such as tire applications. The metal-treated carbon blacks are aggregates containing at least a carbon phase and a metal-containing species phase. The metal-containing species include compounds containing aluminum, zinc, magnesium, calcium, titanium, vanadium, cobalt, nickel, zirconium, tin, antimony, chromium, neodymium, lead, tellurium, barium, cesium, iron, and molybdenum. Preferably, the metal-containing species phase is an aluminum- or zinc-containing species phase. The metal-containing species include, but are not limited to, oxides of metals. The metal-containing species phase can be distributed through at least a portion of the aggregate and is an intrinsic part of the aggregate. These metal-treated carbon blacks may be incorporated into elastomeric compounds and can lead to desirable properties by compounding an elastomer with a metal-treated carbon black.

Metal-treated carbon black aggregates do not represent a mixture of discrete carbon black aggregates and discrete metal-containing aggregates. Rather, the metal-treated carbon black aggregates of the present invention include at least one metal-containing region concentrated at or near the surface of the aggregate (but part of the aggregate) or within the aggregate. Thus, as stated earlier, the metal-treated carbon black aggregates can be described as aggregates comprising a carbon phase and a metal-containing species phase. The aggregates thus contain at least two phases, one of which is carbon and the other of which is a metal-containing species. The metal-containing species phase that is part of the aggregate is not attached to a carbon black aggregate like a silane coupling agent, but actually is part of the same aggregate as the carbon phase. Further, it is within the bounds of the present invention to have a metal-treated carbon black containing more than one type of a metal-containing species phase or the metal-treated carbon black can also contain a silicon-containing species phase and/or a boron-containing species phase. For example, the metal-treated carbon black of the present invention can have an aggregate comprising a carbon phase, an aluminum-containing species phase, and a zinc-containing species phase. Accordingly, the metal-treated carbon black of the present invention can have two or more different types of metal-containing species phases and/or additional non-metal species phases.

As indicated above, the aggregate of the present invention can additionally contain a silicon-containing species phase as described in U.S. patent applications Ser. Nos. 08/446,141; 08/446,142; 08/528,895; and 08/750,017, and PCT Published Application No. WO 96/37547, all incorporated in their entireties by reference.

Figure 1:
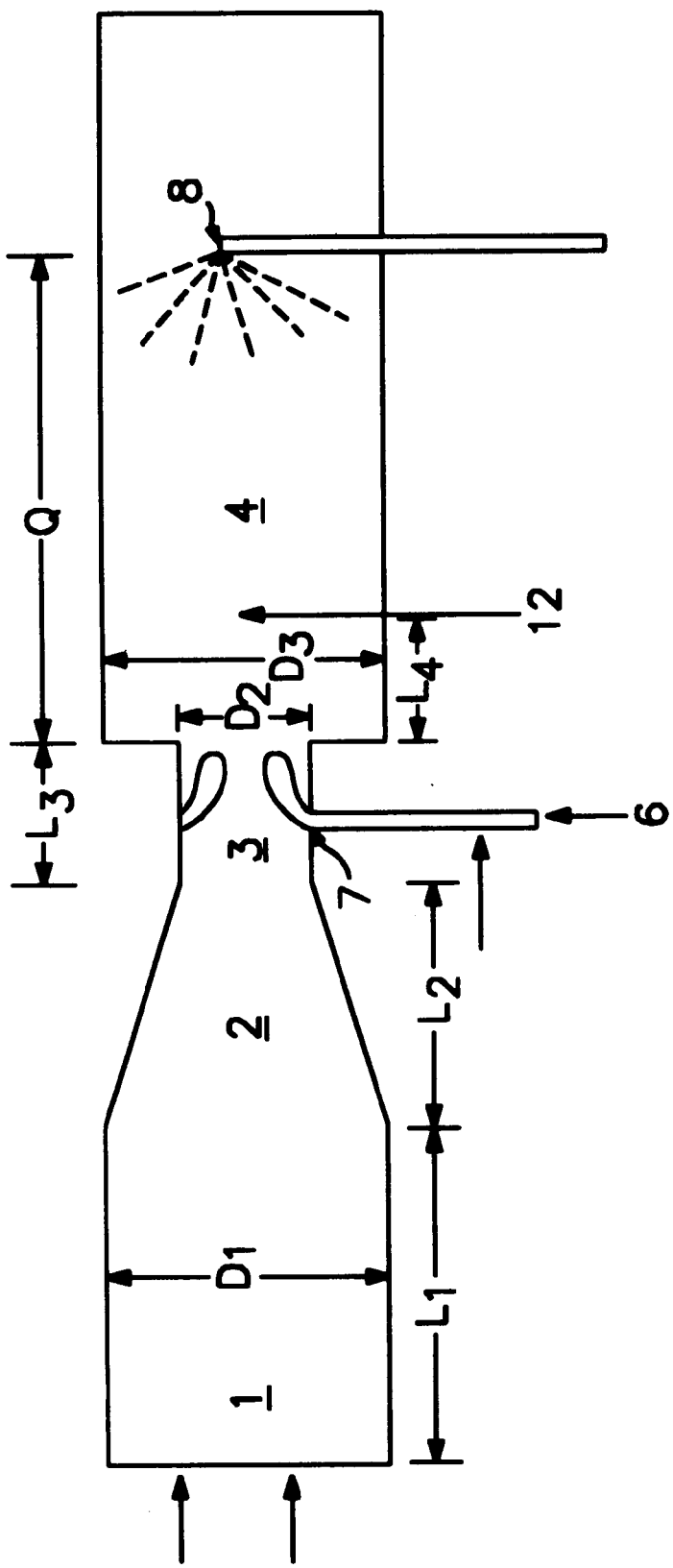
FIG. 1 is a schematic view of a portion of one type of carbon black reactor which may be used to produce the treated carbon blacks of the present invention.

The metal-treated carbon blacks may be obtained by manufacturing the carbon black in the presence of volatilazable or decomposible metal-containing compounds. Such carbon blacks are preferably produced in a modular or "staged," furnace carbon black reactor as depicted in FIG. 1. The furnace carbon black reactor has a combustion zone 1, with a zone of converging diameter 2; a feedstock injection zone with restricted diameter 3; and a reaction zone 4.

To produce carbon blacks with the reactor described above, hot combustion gases are generated in combustion zone 1 by contacting a liquid or gaseous fuel with a suitable oxidant stream such as air, oxygen, or mixtures of air and oxygen. Among the fuels suitable for use in contacting the oxidant stream in combustion zone 1, to generate the hot combustion gases, are included any readily combustible gas, vapor or liquid streams such as natural gas, hydrogen, methane, acetylene, alcohols, or kerosene. It is generally preferred, however, to use fuels having a high content of carbon-containing components and in particular, hydrocarbons. The ratio of air to fuel varies with the type of fuel utilized. When natural gas is used to produce the carbon blacks of the present invention, the ratio of air to fuel may be from about 10:1 to about 1000:1. To facilitate the generation of hot combustion gases, the oxidant stream may be pre-heated.

The hot combustion gas stream flows downstream from zones 1 and 2 into zones 3 and 4. The direction of the flow of hot combustion gases is shown in FIG. 1 by the arrow. Carbon black feedstock, 6, is introduced at point 7 into the feedstock injection zone 3. The feedstock is injected into the gas stream through nozzles designed for optimal distribution of the oil in the gas stream. Such nozzles may be either single or bi-fluid. Bi-fluid nozzles may use steam or air to atomize the fuel. Single-fluid nozzles may be pressure atomized or the feedstock can be directly injected into the gas-stream. In the latter instance, atomization occurs by the force of the gas-stream.

Carbon blacks can be produced by the pyrolysis or partial combustion of any liquid or gaseous hydrocarbon. Preferred carbon black feedstocks include petroleum refinery sources such as decanted oils from catalytic cracking operations, as well as the by-products from coking operations and olefin manufacturing operations.

The mixture of carbon black-yielding feedstock and hot combustion gases flows downstream through zone 3 and 4. In the reaction zone portion of the reactor, the feedstock is pyrolyzed to carbon black. The reaction is arrested in the quench zone of the reactor. Quench 8 is located downstream of the reaction zone and sprays a quenching fluid, generally water, into the stream of newly formed carbon black particles. The quench serves to cool the carbon black particles and to reduce the temperature of the gaseous stream and decrease the reaction rate. Q is the distance from the beginning of reaction zone 4 to quench point 8, and will vary according to the position of the quench. Optionally, quenching may be staged, or take place at several points in the reactor.

After the carbon black is quenched, the cooled gases and carbon black pass downstream into any conventional cooling and separating means whereby the carbon black is recovered. The separation of the carbon black from the gas stream is readily accomplished by conventional means such as a precipitator, cyclone separator, bag filter or other means known to those skilled in the art. After the carbon black has been separated from the gas stream, it is optionally subjected to a pelletization step.

The metal-treated carbon blacks of the present invention may be made by introducing a volatilizable metal-containing compound into the carbon black reactor at a point upstream of the quench zone. Useful volatilizable compounds (i.e., the metal-containing compounds) include any compound, which is volatilizable at carbon black reactor temperatures. Examples include volatilizable or decomposible compounds containing aluminum, zinc, magnesium, calcium, titanium, vanadium, cobalt, nickel, zirconium, tin, antimony, chromium, neodymium, lead, tellurium, barium, cesium, iron, and molybdenum. Specific examples include, but are not limited to, butoxides such as Aluminum III n-Butoxide and Aluminum III s-Butoxide, and propoxides, such as Al III iso-propoxide. Examples of suitable zinc-containing compounds include, but are not limited to, zinc napthenate and zinc octoate. Other examples include, but are not limited to, magnesium ethoxide, magnesium isopropoxide, calcium propoxide, titanium isopropoxide, cobaltous napthenate, tin diethyl oxide, neodymium oxalate, and the like. The flow rate of the volatilizable compound will determine the weight percent of metal in the treated carbon black. The weight percent of the elemental metal (e.g., elemental aluminum or zinc) in the treated carbon black generally ranges from about 0.1% to 25%, by weight of the aggregate, but may be adjusted to any desired level, such as up to 50% by weight, greater than 50% by weight, or up to 99% by weight of the aggregate.

The volatilizable compound may be premixed with the carbon black-forming feedstock and introduced with the feedstock into the reaction zone. Alternatively, the volatilizable compound may be introduced to the reaction zone separately from the feedstock injection point. Such introduction may be upstream or downstream from the feedstock injection point, provided the volatilizable compound is introduced upstream from the quench zone. For example, referring to FIG. 1, the volatilizable compound may be introduced to zone Q at point 12 or any other point in the zone. Upon volatilization and exposure to high temperatures in the reactor, the compound decomposes, and reacts with other species in the reaction zone, yielding metal-treated carbon black, such that the metal, or metal-containing species, becomes an intrinsic part of the carbon black.

Besides volatalizable compounds, decomposible metal-containing compounds which are not necessarily volatilizable can also be used to yield the metal-treated carbon black.

As discussed in further detail below, if the volatilizable compound is introduced substantially simultaneously with the feedstock, the metal-treated regions are distributed throughout at least a portion of the carbon black aggregate.

In a second embodiment of the present invention, the volatilizable compound is introduced to the reaction zone at a point after carbon black formation has commenced but before the reaction stream has been subjected to the quench. In this embodiment, metal-treated carbon black aggregates are obtained in which the metal-containing species phase is concentrated primarily at or near the surface of the aggregate.

It has been found by the present inventors that the elastomeric compounds incorporating a metal-treated carbon black may be additionally compounded with one or more coupling agents to further enhance the properties of the elastomeric compound. Coupling agents, as used herein, include, but are not limited to, compounds that are capable of coupling fillers such as carbon black or silica to an elastomer. Coupling agents useful for coupling silica or carbon black to an elastomer, are expected to be useful with the metal-treated carbon blacks. Useful coupling agents include, but are not limited to, silane coupling agents such as bis(3-triethoxysilylpropyl)tetrasulfane (Si-69), 3-thiocyanatopropyl-triethoxy silane (Si-264, from Degussa AG, Germany), γ-mercaptopropyl-trimethoxy silane (A189, from Union Carbide Corp., Danbury, Conn.); zirconate coupling agents, such as zirconium dineoalkanolatodi(3-mercapto)propionato-O (NZ 66A, from Kenrich Petrochemicals, Inc., of Bayonne, N.J.); titanate coupling agents; nitro coupling agents such as N,N'-bis(2-methyl-2-nitropropyl)-1,6-diaminohexane (Sumifine 1162, from Sumitomo Chemical Co., Japan); and mixtures of any of the foregoing. The coupling agents may be provided as a mixture with a suitable carrier, for example X50-S which is a mixture of Si-69 and N330 carbon black, available from Degussa AG.

The metal-treated carbon black may also be modified to have at least one organic group attached to the metal-treated carbon black. Alternatively, or in addition, a mixture of metal-treated carbon black and a modified carbon black having at least one attached organic group may be used. In addition, it is within the bounds of the present invention to use a mixture of two or more types of metal-treated carbon black in the elastomeric compositions of the present invention.

Methods for attaching organic groups to carbon black and a further discussion of the types of organic groups that can be attached can be found in U.S. patent application Ser. Nos. 08/356,660; 08/572,525; and 08/356,459, now U.S. Pat. No. 5,559,169; and PCT Published Applications Nos. WO 96/18688 and WO 96/18696, the disclosures of which are fully incorporated by reference herein.

One process for attaching an organic group to the carbon black involves the reaction of at least one diazonium salt with a carbon black in the absence of an externally applied current sufficient to reduce the diazonium salt. That is, the reaction between the diazonium salt and the carbon black proceeds without an external source of electrons sufficient to reduce the diazonium salt. Mixtures of different diazonium salts may be used in the process of the invention. This process can be carried out under a variety of reaction conditions and in any type of reaction medium, including both protic and aprotic solvent systems or slurries.

In another process, at least one diazonium salt reacts with a carbon black in a protic reaction medium. Mixtures of different diazonium salts may be used in this process of the invention. This process can also be carried out under a variety of reaction conditions.

Preferably, in both processes, the diazonium salt is formed in situ. If desired, in either process, the carbon black product can be isolated and dried by means known in the art. Furthermore, the resultant carbon black product can be treated to remove impurities by known techniques. The various preferred embodiments of these processes are discussed below.

These processes can be carried out under a wide variety of conditions and in general are not limited by any particular condition. The reaction conditions must be such that the particular diazonium salt is sufficiently stable to allow it to react with the carbon black. Thus, the processes can be carried out under reaction conditions where the diazonium salt is short lived. The reaction between the diazonium salt and the carbon black occurs, for example, over a wide range of pH and temperature. The processes can be carried out at acidic, neutral, and basic pH. Preferably, the pH ranges from about 1 to 9. The reaction temperature may preferably range from 0° C. to 100° C.

Diazonium salts, as known in the art, may be formed for example by the reaction of primary amines with aqueous solutions of nitrous acid. A general discussion of diazonium salts and methods for their preparation is found in Morrison and Boyd, *Organic Chemistry*, 5th Ed., pp. 973–983, (Allyn and Bacon, Inc. 1987) and March, *Advanced Organic Chemistry: Reactions, Mechanisms, and Structures*, 4th Ed., (Wiley, 1992). According to this invention, a diazonium salt is an organic compound having one or more diazonium groups.

The diazonium salt may be prepared prior to reaction with the carbon black or, more preferably, generated in situ using techniques known in the art. In situ generation also allows the use of unstable diazonium salts such as alkyl diazonium salts and avoids unnecessary handling or manipulation of the diazonium salt. In particularly preferred processes, both the nitrous acid and the diazonium salt are generated in situ.

A diazonium salt, as is known in the art, may be generated by reacting a primary amine, a nitrite and an acid. The nitrite may be any metal nitrite, preferably lithium nitrite, sodium nitrite, potassium nitrite, or zinc nitrite, or any organic nitrite such as for example isoamylnitrite or ethylnitrite. The acid may be any acid, inorganic or organic, which is effective in the generation of the diazonium salt. Preferred acids include nitric acid, $HNO_3$, hydrochloric acid, HCl, and sulfuric acid, $H_2SO_4$.

The diazonium salt may also be generated by reacting the primary amine with an aqueous solution of nitrogen dioxide. The aqueous solution of nitrogen dioxide, $NO_2/H_2O$, provides the nitrous acid needed to generate the diazonium salt.

Generating the diazonium salt in the presence of excess HCl may be less preferred than other alternatives because HCl is corrosive to stainless steel. Generation of the diazonium salt with $NO_2/H_2O$ has the additional advantage of being less corrosive to stainless steel or other metals commonly used for reaction vessels. Generation using $H_2SO_4$/$NaNO_2$ or $HNO_3$/$NaNO_2$ are also relatively non-corrosive.

In general, generating a diazonium salt from a primary amine, a nitrite, and an acid requires two equivalents of acid based on the amount of amine used. In an in situ process, the diazonium salt can be generated using one equivalent of the acid. When the primary amine contains a strong acid group, adding a separate acid may not be necessary. The acid group or groups of the primary amine can supply one or both of the needed equivalents of acid. When the primary amine contains a strong acid group, preferably either no additional acid or up to one equivalent of additional acid is added to a process of the invention to generate the diazonium salt in situ. A slight excess of additional acid may be used. One example of such a primary amine is para-aminobenzenesulfonic acid (sulfanilic acid).

In general, diazonium salts are thermally unstable. They are typically prepared in solution at low temperatures, such as 0–5° C., and used without isolation of the salt. Heating solutions of some diazonium salts may liberate nitrogen and form either the corresponding alcohols in acidic media or the organic free radicals in basic media.

However, the diazonium salt need only be sufficiently stable to allow reaction with the carbon black. Thus, the processes can be carried out with some diazonium salts otherwise considered to be unstable and subject to decomposition. Some decomposition processes may compete with the reaction between the carbon black and the diazonium salt and may reduce the total number of organic groups attached to the carbon black. Further, the reaction may be carried out at elevated temperatures where many diazonium salts may be susceptible to decomposition. Elevated temperatures may also advantageously increase the solubility of the diazonium salt in the reaction medium and improve its handling during the process. However, elevated temperatures may result in some loss of the diazonium salt due to other decomposition processes.

Reagents can be added to form the diazonium salt in situ, to a suspension of carbon black in the reaction medium, for example, water. Thus, a carbon black suspension to be used may already contain one or more reagents to generate the diazonium salt and the process accomplished by adding the remaining reagents.

Reactions to form a diazonium salt are compatible with a large variety of functional groups commonly found on organic compounds. Thus, only the availability of a diazonium salt for reaction with a carbon black limits the processes of the invention.

The processes can be carried out in any reaction medium which allows the reaction between the diazonium salt and the carbon black to proceed. Preferably, the reaction medium is a solvent-based system. The solvent may be a protic solvent, an aprotic solvent, or a mixture of solvents. Protic solvents are solvents, like water or methanol, containing a hydrogen attached to an oxygen or nitrogen and thus are sufficiently acidic to form hydrogen bonds. Aprotic solvents are solvents which do not contain an acidic hydrogen as defined above. Aprotic solvents include, for example, solvents such as hexanes, tetrahydrofuran (THF), acetonitrile, and benzonitrile. For a discussion of protic and aprotic solvents see Morrison and Boyd, *Organic Chemistry*, 5th Ed., pp. 228–231, (Allyn and Bacon, Inc. 1987).

The processes are preferably carried out in a protic reaction medium, that is, in a protic solvent alone or a mixture of solvents which contains at least one protic solvent. Preferred protic media include, but are not limited to water, aqueous media containing water and other solvents, alcohols, and any media containing an alcohol, or mixtures of such media.

The reaction between a diazonium salt and a carbon black can take place with any type of carbon black, for example, in fluffy or pelleted form. In one embodiment designed to reduce production costs, the reaction occurs during a process for forming carbon black pellets. For example, a carbon black product of the invention can be prepared in a dry drum by spraying a solution or slurry of a diazonium salt onto a carbon black. Alternatively, the carbon black product can be prepared by pelletizing a carbon black in the presence of a solvent system, such as water, containing the diazonium salt or the reagents to generate the diazonium salt in situ. Aqueous solvent systems are preferred. Accordingly, another embodiment provides a process for forming a pelletized carbon black comprising the steps of: introducing a carbon black and an aqueous slurry or solution of a diazonium salt into a pelletizer, reacting the diazonium salt with the carbon black to attach an organic group to the carbon black, and pelletizing the resulting carbon black having an attached organic group. The pelletized carbon black product may then be dried using conventional techniques.

In general, the processes produce inorganic by-products, such as salts. In some end uses, such as those discussed below, these by-products may be undesirable. Several possible ways to produce a carbon black product without unwanted inorganic by-products or salts are as follows:

First, the diazonium salt can be purified before use by removing the unwanted inorganic by-product using means known in the art. Second, the diazonium salt can be generated with the use of an organic nitrite as the diazotization agent yielding the corresponding alcohol rather than an inorganic salt. Third, when the diazonium salt is generated from an amine having an acid group and aqueous $NO_2$, no inorganic salts are formed. Other ways may be known to those of skill in the art.

In addition to the inorganic by-products, a process may also produce organic by-products. They can be removed, for example, by extraction with organic solvents. Other ways of obtaining products without unwanted organic by-products may be known to those of skill in the art and include washing or removal of ions by reverse osmosis.

The reaction between a diazonium salt and a carbon black forms a carbon black product having an organic group attached to the carbon black. The diazonium salt may contain the organic group to be attached to the carbon black. It may be possible to produce the carbon black products of this invention by other means known to those skilled in the art.

The organic group may be an aliphatic group, a cyclic organic group, or an organic compound having an aliphatic portion and a cyclic portion. As discussed above, the diazonium salt employed in the processes can be derived from a primary amine having one of these groups and being capable of forming, even transiently, a diazonium salt. The organic group may be substituted or unsubstituted, branched or unbranched. Aliphatic groups include, for example, groups derived from alkanes, alkenes, alcohols, ethers, aldehydes, ketones, carboxylic acids, and carbohydrates. Cyclic organic groups include, but are not limited to, alicyclic hydrocarbon groups (for example, cycloalkyls, cycloalkenyls), heterocyclic hydrocarbon groups (for example, pyrrolidinyl, pyrrolinyl, piperidinyl, morpholinyl, and the like), aryl groups (for example, phenyl, naphthyl, anthracenyl, and the like), and heteroaryl groups (imidazolyl, pyrazolyl, pyridinyl, thienyl, thiazolyl, furyl, indolyl, and the like). As the stearic hindrance of a substituted organic group increases, the number of organic groups attached to the carbon black from the reaction between the diazonium salt and the carbon black may be diminished.

When the organic group is substituted, it may contain any functional group compatible with the formation of a diazonium salt. Preferred functional groups include, but are not limited to, R, OR, COR, COOR, OCOR, carboxylate salts such as COOLi, COONa, COOK, $COO^-NR_4^+$, halogen, CN, $NR_2$, $SO_3H$, sulfonate salts such as $SO_3Li$, $SO_3Na$, $SO_3K$, $SO_3^-NR_4^+$, $OSO_3H$, $OSO_3^-$ salts, NR(COR), $CONR_2$, $NO_2$, $PO_3H_2$, phosphonate salts such as $PO_3HNa$ and $PO_3Na_2$, phosphate salts such as $OPO_3HNa$ and $OPO_3Na_2$, N=NR, $NR_3^+X^-$, $PR_3^+X^-$, $S_kR$, $SSO_3H$, $SSO_3^-$ salts, $SO_2NRR'$, $SO_2SR$, SNRR', SNQ, $SO_2NQ$, $CO_2NQ$, S-(1,4-piperazinediyl)-SR, 2-(1,3-dithianyl) 2-(1,3-dithiolanyl), SOR, and $SO_2R$. R and R', which can be the same or different, are independently hydrogen, branched or unbranched $C_1$–$C_{20}$ substituted or unsubstituted, saturated or unsaturated hydrocarbon, e.g., alkyl, alkenyl, alkynyl, substituted or unsubstituted aryl, substituted or unsubstituted heteroaryl, substituted or unsubstituted alkylaryl, or substituted or unsubstituted arylalkyl. The integer k ranges from 1–8 and preferably from 2–4. The anion $X^-$ is a halide or an anion derived from a mineral or organic acid. Q is $(CH_2)_w$, $(CH_2)_xO(CH_2)_z$, $(CH_2)_xNR(CH_2)_z$, or $(CH_2)_xS(CH_2)_z$, where w is an integer from 2 to 6 and x and z are integers from 1 to 6.

A preferred organic group is an aromatic group of the formula $A_yAr$—, which corresponds to a primary amine of the formula $A_yArNH_2$. In this formula, the variables have the following meanings: Ar is an aromatic radical such as an aryl or heteroaryl group. Preferably, Ar is selected from the group consisting of phenyl, naphthyl, anthracenyl, phenanthrenyl, biphenyl, pyridinyl, benzothiadiazolyl, and benzothiazolyl; A is a substituent on the aromatic radical independently selected from a preferred functional group described above or A is a linear, branched or cyclic hydrocarbon radical (preferably containing 1 to 20 carbon atoms), unsubstituted or substituted with one or more of those functional groups; and y is an integer from 1 to the total number of —CH radicals in the aromatic radical. For instance, y is an integer from 1 to 5 when Ar is phenyl, 1 to 7 when Ar is naphthyl, 1 to 9 when Ar is anthracenyl, phenanthrenyl, or biphenyl, or 1 to 4 when Ar is pyridinyl. In the above formula, specific examples of R and R' are $NH_2$—$C_6H_4$—, $CH_2CH_2$—$C_6H_4$—$NH_2$, $CH_2$—$C_6H_4$—$NH_2$, and $C_6H_5$.

Another preferred set of organic groups which may be attached to the carbon black are organic groups substituted with an ionic or an ionizable group as a functional group. An ionizable group is one which is capable of forming an ionic group in the medium of use. The ionic group may be an anionic group or a cationic group and the ionizable group may form an anion or a cation.

Ionizable functional groups forming anions include, for example, acidic groups or salts of acidic groups. The organic groups, therefore, include groups derived from organic acids. Preferably, when it contains an ionizable group forming an anion, such an organic group has a) an aromatic group and b) at least one acidic group having a pKa of less than 11, or at least one salt of an acidic group having a pKa of less than 11, or a mixture of at least one acidic group having a pKa of less than 11 and at least one salt of an acidic group having a pKa of less than 11. The pKa of the acidic group refers to the pKa of the organic group as a whole, not just the acidic substituent. More preferably, the pKa is less than 10 and most preferably less than 9. Preferably, the aromatic group of the organic group is directly attached to the carbon black. The aromatic group may be further substituted or unsubstituted, for example, with alkyl groups. More preferably, the organic group is a phenyl or a naphthyl group and the acidic group is a sulfonic acid group, a sulfinic acid group, a phosphonic acid group, or a carboxylic acid group. Examples of these acidic groups and their salts are discussed above. Most preferably, the organic group is a substituted or unsubstituted sulfophenyl group or a salt thereof; a substituted or unsubstituted (polysulfo)phenyl group or a salt thereof; a substituted or unsubstituted sulfonaphthyl group or a salt thereof; or a substituted or unsubstituted (polysulfo) naphthyl group or a salt thereof. A preferred substituted sulfophenyl group is hydroxysulfophenyl group or a salt thereof.

Specific organic groups having an ionizable functional group forming an anion (and their corresponding primary amines) are p-sulfophenyl (p-sulfanilic acid), 4-hydroxy-3-sulfophenyl (2-hydroxy-5-amino-benzenesulfonic acid), and 2-sulfoethyl (2-aminoethanesulfonic acid). Other organic groups having ionizable functional groups forming anions can also be used.

Amines represent examples of ionizable functional groups that form cationic groups. For example, amines may be protonated to form ammonium groups in acidic media. Preferably, an organic group having an amine substituent has a pKb of less than 5. Quaternary ammonium groups ($-NR_3^+$) and quaternary phosphonium groups ($-PR_3^+$) also represent examples of cationic groups. Preferably, the organic group contains an aromatic group such as a phenyl or a naphthyl group and a quaternary ammonium or a quaternary phosphonium group. The aromatic group is preferably directly attached to the carbon black. Quaternized cyclic amines, and even quaternized aromatic amines, can also be used as the organic group. Thus, N-substituted pyridinium compounds, such as N-methyl-pyridyl, can be used in this regard. Examples of organic groups include, but are not limited to, $(C_5H_4N)C_2H_5^+$, $C_6H_4(NC_5H_5)^+$, $C_6H_4COCH_2N(CH_3)_3^+$, $C_6H_4COCH_2(NC_5H_5)^+$, $(C_5H_4N)CH_3^+$, and $C_6H_4CH_2N(CH_3)_3^+$.

An advantage of the carbon black products having an attached organic group substituted with an ionic or an ionizable group is that the carbon black product may have increased water dispersibility relative to the corresponding untreated carbon black. Water dispersibility of a carbon black product increases with the number of organic groups attached to the carbon black having an ionizable group or the number of ionizable groups attached to a given organic group. Thus, increasing the number of ionizable groups associated with the carbon black product should increase its water dispersibility and permits control of the water dispersibility to a desired level. It can be noted that the water dispersibility of a carbon black product containing an amine as the organic group attached to the carbon black may be increased by acidifying the aqueous medium.

Because the water dispersibility of the carbon black products depends to some extent on charge stabilization, it is preferable that the ionic strength of the aqueous medium be less than 0.1 molar. More preferably, the ionic strength is less than 0.01 molar.

When such a water dispersible carbon black product is prepared, it is preferred that the ionic or ionizable groups be ionized in the reaction medium. The resulting product solution or slurry may be used as is or diluted prior to use. Alternatively, the carbon black product may be dried by techniques used for conventional carbon blacks. These techniques include, but are not limited to, drying in ovens and rotary kilns. Overdrying, however, may cause a loss in the degree of water dispersibility.

In addition to their water dispersibility, carbon black products having an organic group substituted with an ionic or an ionizable group may also be dispersible in polar organic solvents such as dimethylsulfoxide (DMSO), and formamide. In alcohols such as methanol or ethanol, use of complexing agents such as crown ethers increases the dispersibility of carbon black products having an organic group containing a metal salt of an acidic group.

Aromatic sulfides encompass another group of preferred organic groups. Carbon black products having aromatic sulfide groups are particularly useful in rubber compositions. These aromatic sulfides can be represented by the formulas $Ar(CH_2)_qS_k(CH_2)_rAr'$ or $A-(CH_2)_qS_k(CH_2)_rAr''$ wherein Ar and Ar' are independently substituted or unsubstituted arylene or heteroarylene groups, Ar" is an aryl or heteroaryl group, k is 1 to 8 and q and r are 0–4. Substituted aryl groups would include substituted alkylaryl groups. Preferred arylene groups include phenylene groups, particularly p-phenylene groups, or benzothiazolylene groups. Preferred aryl groups include phenyl, naphthyl and benzothiazolyl. The number of sulfurs present, defined by k preferably ranges from 2 to 4. Preferred carbon black products are those having an attached aromatic sulfide organic group of the formula $-(C_6H_4)-S_k-(C_6H_4)-$, where k is an integer from 1 to 8, and more preferably where k ranges from 2 to 4. Particularly preferred aromatic sulfide groups are bis-para-$(C_6H_4)-S_2-(C_6H_4)-$ and para-$(C_6H_4)-S_2-(C_6H_5)$. The diazonium salts of these aromatic sulfide groups may be conveniently prepared from their corresponding primary amines, $H_2N-Ar-S_k-Ar'-NH_2$ or $H_2N-Ar-S_k-Ar''$. Preferred groups include dithiodi-4,1-phenylene, tetrathiodi-4,1-phenylene, phenyldithiophenylene, dithiodi-4,1-(3-chlorophenylene), $-(4-C_6H_4)-S-S-(2-C_7H_4NS)$, $-(4-C_6H_4)-S-S-(4-C_6H_4)-OH$, $-6-(2-C_7H_3NS)-SH$, $-(4-C_6H_4)-CH_2CH_2-S-S-CH_2CH_2-(4-C_6H_4)-$, $-(4-C_6H_4)-CH_2CH_2-S-S-CH_2CH_2-(4-C_6H_4)-$, $-(2-C_6H_4)-S-S-(2-C_6H_4)-$, $-(3-C_6H_4)-S-S-(3-C_6H_4)-$, $-6-(C_6H_3N_2S)$, $-6-(2-C_7H_3NS)-S-NRR'$ where RR' is $-CH_2CH_2OCH_2CH_2-$, $-(4-C_6H_4)-S-S-S-S-(4-C_6H_4)-$, $-(4-C_6H_4)-CH=CH_2$, $-(4-C_6H_4)-S-SO_3H$, $-(4-C_6H_4)-SO_2NH-(4-C_6H_4)-S-S-(4-C_6H_4)-NHSO_2-(4-C_6H_4)-$, $6-(2-C_7H_3NS)-S-S-2-(6-C_7H_3NS)-$, $-(4-C_6H_4)-S-CH_2-(4-C_6H_4)-$, $-(4-C_6H_4)-SO_2-S-(4-C_6H_4)-$, $-(4-C_6H_4)-CH_2-S-CH_2-(4-C_6H_4)-$, $-(3-C_6H_4)-CH_2-S-CH_2-(3-C_6H_4)-$, $-(4-C_6H_4)-CH_2-S-S-CH_2-(4-C_6H_4)-$, $-(3-C_6H_4)-CH_2-S-S-CH_2-(3-C_6H_4)-$, $-(4-C_6H_4)-S-NRR'$ where RR' is $-CH_2CH_2OCH_2CH_2-$, $-(4-C_6H_4)-SO_2NH-CH_2CH_2-S-S-CH_2CH_2-NHSO_2-(4-C_6H_4)-$, $-(4-C_6H_4)-2-(1,3-dithianyl;)$, and $-(4-C_6H_4)-S-(1,4-piperizinediyl)-S-(4-C_6H_4)-$.

Another preferred set of organic groups which may be attached to the carbon black are organic groups having an aminophenyl, such as $(C_6H_4)-NH_2$, $(C_6H_4)-CH_2-(C_6H_4)-NH_2$, $(C_6H_4)-SO_2-(C_6H_4)-NH_2$. Preferred organic groups also include aromatic sulfides, represented by the formulas $Ar-S_n-Ar'$ or $Ar-S_n-Ar''$, wherein Ar and Ar' are independently arylene groups, Ar" is an aryl and n is 1 to 8. Methods for attaching such organic groups to carbon black are discussed in U.S. patent applications Ser. Nos. 08/356,660, 08/572,525, and 08/356,459, the disclosures of which are fully incorporated by reference herein.

Furthermore, it is within the bounds of this application to also use a mixture of silica and metal-treated carbon black. Also, any combination of additional components with the metal-treated carbon black may be used such as one or more of the following:

a) metal-treated carbon black with an attached organic group, optionally treated with silane coupling agents;

b) silica;

c) modified silica, for example, having an attached organic group; and/or d) other inorganic fillers and their chemically modified derivatives;

e) carbon black; and/or f) modified carbon black having an attached organic group;

g) silicon-treated carbon black, optionally having attached organic groups. Examples of silica include, but are not limited to, silica, precipitated silica, amorphous silica, vitreous silica, fumed silica, fused silica, silicates (e.g., alumina silicates) and other Si containing fillers such as clay, talc, wollastonite, etc. Silicas are commercially available from such sources as Cabot Corporation under the Cab-O-Sil® tradename; PPG Industries under the Hi-Sil and Ceptane tradenames; Rhone-Poulenc under the Zeosil tradename; and Degussa AG under the Ultrasil and Coupsil tradenames.

The elastomeric compounds of the present invention may be prepared from the treated carbon blacks by compounding with any elastomer including those useful for compounding a carbon black.

Any suitable elastomer may be compounded with the metal-treated carbon blacks to provide the elastomeric compounds of the present invention. Such elastomers include, but are not limited to, rubbers, homo- or co-polymers of 1,3-butadiene, styrene, isoprene, isobutylene, 2,3-dimethyl-1,3-butadiene, acrylonitrile, ethylene, and propylene Preferably, the elastomer has a glass transition temperature (Tg) as measured by differential scanning colorimetry (DSC) ranging from about –120° C. to about 0° C. Examples include, but are not limited, styrene-butadiene rubber (SBR), natural rubber, polybutadiene, polyisoprene, and their oil-extended derivatives. Blends of any of the foregoing may also be used.

Among the rubbers suitable for use with the present invention are natural rubber and its derivatives such as chlorinated rubber. The metal-treated carbon black products of the invention may also be used with synthetic rubbers such as: copolymers of from about 10 to about 70 percent by weight of styrene and from about 30 to about 90 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl 2-vinylpyridine, 5-ethyl-2-vinylpyridine, 2-methyl-5-vinylpyridine, alkyl-substituted acrylates, vinyl ketone, methyl isopropenyl ketone, methyl vinyl either, alphamethylene carboxylic acids and the esters and amides thereof such as acrylic acid and dialkylacrylic acid amide; also suitable for use herein are copolymers of ethylene and other high alpha olefins such as propylene, butene-1 and pentene-1.

The rubber compositions of the present invention can therefore contain an elastomer, curing agents, reinforcing filler, a coupling agent, and, optionally, various processing aids, oil extenders, and antidegradents. In addition to the examples mentioned above, the elastomer can be, but is not limited to, polymers (e.g., homopolymers, copolymers, and terpolymers) manufactured from 1,3 butadiene, styrene, isoprene, isobutylene, 2,3-dimethyl-1,3 butadiene, acrylonitrile, ethylene, propylene, and the like. It is preferred that these elastomers have a glass transition point (Tg), as measured by DSC, between –120° C. and 0° C. Examples of such elastomers include poly(butadiene), poly(styrene-co-butadiene), and poly(isoprene).

Elastomeric compositions also include vulcanized compositions (VR), thermoplastic vulcanizates (TPV), thermoplastic elastomers (TPE) and thermoplastic polyolefins (TPO). TPV, TPE, and TPO materials are further classified by their ability to be extruded and molded several times without loss of performance characteristics.

In making the elastomeric compositions, one or more curing agents such as, for example, sulfur, sulfur donors, activators, accelerators, peroxides, and other systems used to effect vulcanization of the elastomer composition may be used.

Formulation of the metal-treated carbon blacks of the present invention with elastomers are contemplated to have advantages not realized when such elastomers are formulated with conventional carbon blacks.

The following examples illustrate the invention without limitation.

EXAMPLES

Example 1

Aluminum-treated carbon blacks according to the present invention were prepared using a pilot scale reactor generally as described above, and as depicted in FIG. 1 and having the dimensions set forth below: $D_1$=4 inches, $D_2$=2 inches, $D_3$=5 inches, $L_1$=4 inches, $L_2$=5 inches, $L_3$=7 inches, $L_4$=1 foot and Q=4.5 feet. The reaction conditions set forth in Table 1 below, were employed.

These conditions result in the formation of a carbon black identified by the ASTM designation N234. A commercially available example of N234 is Vulcan® 7H from Cabot Corporation, Boston, Mass. These conditions were altered by adding a volatilizable aluminum-containing compound into the reactor, to obtain an aluminum-treated carbon black. The flow rate of the volatilizable compound was adjusted to alter the weight percent of aluminum in the treated carbon black. The weight percent of aluminum in the treated carbon black was determined by the ashing test, conducted according to ASTM procedure D-1506.

One such new treated carbon black was made by introducing a solution of 70% Aluminum III s-Butoxide and 30% s-Butanol into the hydrocarbon feedstock. This compound was obtained from Gelest Inc., Tullytown, Pa. The resultant aluminum-treated carbon blacks are identified herein as Al-CB1, Al-CB2 and AlCB4. A different aluminum-treated carbon black (Al-CB3) was prepared by introducing the aluminum-containing volatilizable compound, into the reactor at location $L_4$.

Since changes in reactor temperature are known to alter the surface area of the carbon black, and reactor temperature is very sensitive to the total flow rate of the feedstock in the injection zone (zone 3 in FIG. 1), the feedstock flow rate was adjusted downward to approximately compensate for the introduction of the volatilizable aluminum-containing compound, such that a constant reactor temperature was maintained. This results in an approximately constant external surface area (as measured by t area) for the resultant carbon blacks. All other conditions were maintained as necessary for manufacturing N234 carbon black. No such adjustment is needed when making sample Al-CB3, where the aluminum-containing compound was introduced into L$_4$. A structure control additive (potassium acetate solution) was injected into the feedstock to maintain the specification structure of the N234 carbon black. The flow rate of this additive was maintained constant in making the aluminum-treated carbon blacks described throughout the following examples.

The external surface area (t-area) was measured following the sample preparation and measurement procedure described in ASTM D3037—Method A for Nitrogen surface area. For this measurement, the nitrogen adsorption isotherm was extended up to 0.55 relative pressure. The relative pressure is the pressure (P) divided by the saturation pressure (P$_0$) (the pressure at which the nitrogen condenses). The adsorption layer thickness (t$_1$) was then calculated using the relation:

$$t_1 = \frac{13.99}{\sqrt{0.034 - \log(P/P_0)}}$$

The volume (V) of nitrogen adsorbed was then plotted against t$_1$. A straight line was then fitted through the data points for t$_1$ values between 3.9 and 6.2 Angstroms. The t-area was then obtained from the slope of this line as follows:

t-area, m$^2$/gm=15.47×slope

TABLE 1

| Conditions | A1-CB1 | A1-CB2 | A1-CB3 | A1-CB4 |
|---|---|---|---|---|
| Air Rate, kscfh | 12.8 | 12.8 | 12.8 | 12.8 |
| Gas Rate, kscfh | 1.033 | 1.029 | 1.028 | 1.036 |
| Feedstock rate, lbs/hr | 128 | 147 | 164 | 142 |
| Al compound rate, lbs/hr | 32 | 8 | 8 | 16 |

The resultant carbon blacks were analyzed for surface area and aluminum content. These values are set forth in Table 2 below:

TABLE 2

|  | t-area | DBP | CDBP | % Al |
|---|---|---|---|---|
| N234 | 119 | 125.8 | 101 | 0.03 |
| A1-CB1 | 116 | 136 | 104 | 2.9 |
| A1-CB2 | 128 | 123 | 98 | 0.9 |
| A1-CB3 | 122 | 121 | 100 | 0.8 |
| A1-CB4 | 115 | 116 | 95 | 2.3 |

Example 2

Preparation of Elastomeric Compositions

The carbon blacks of the previous Examples were used to make elastomeric compounds. Elastomeric compositions incorporating the aluminum-treated carbon blacks discussed above, were prepared using the following elastomers: solution SBR (Duradene 715 from Firestone Synthetic Rubber & Latex Co., Akron, Ohio, and NS 116 from Nippon Zeon Co., Japan), BR (polybutadiene, Taktene 1203 from Bayer Inc., Akron, Ohio). The elastomeric compositions were prepared according to the following formulation:

TABLE 3

|  | N234 | A1-CB |
|---|---|---|
| Solution SBR | 75 | 75 |
| BR | 25 | 25 |
| N234 | 75 | — |
| A1-CB | — | 75 |
| Si 69 ® (phr) | — | 4.5 |
| Sundex 8125 ® | 25 | 25 |
| Zinc oxide | 3.5 | 3.5 |
| Stearic acid | 2 | 2 |
| Flexzone 7P ® | 1.5 | 1.5 |
| Sunproof Imp. ® | 1.5 | 1.5 |
| Durax ® | 1.5 | 1.5 |
| Vanax DPG ® | — | 1.0 |
| TMTD | 0.4 | 0.4 |
| sulfur | 1.4 | 1.4 |

Si 69®-bis(3-triethoxysilylpropyl)tetrasulfide, a coupling agent from Degussa AG, Germany. Sundex 8125-highly aromatic oil, from R. E. Carroll, Trenton, N.J. Flexzone 7P®, N-(1,3-dimethyl butyl)-N'-phenyl-p-phenylene diamine, is an anti-oxidant available from Uniroyal Chemical Co., Middlebury, Conn. Sunproof Imp®.—Sunproof improved, a mixture of waxy materials, from Uniroyal Chemical Co., Middlebury, Conn. Durax®, N-cyclohexane-2-benzothiazole sulphenamide, is an accelerator available from R.T. Vanderbilt Co., of Norwalk, Conn., and Captax®, 2-mercaptobenzothiazole, is an accelerator available from R.T. Vanderbilt Co., Norwalk, Conn. Vanax DPG®— Diphenyl guanidine, an accelerator available from R.T. Vanderbilt Co., of Norwalk, Conn. TMTD-Tetramethyl thiuram disulfide, an accelerator available from R. E. Carroll, Trenton, N.J. Sulfur-crosslinking agent from R. E. Carroll, Trenton, N.J.

The compounds were prepared using either a two-stage or three stage mixing procedure. The internal mixer used for preparing the compounds was a Plasti-Corder EPL-V (obtained from C. W. Brabender, South Hackensack, N.J.) equipped with a camtype mixing head (capacity 600 ml). In the first stage, the mixer was set at 80° C., and the rotor speed was set at 60 rpm. In the case of three stage mixing, after the mixer was conditioned to 100° C. by heating the chamber with a dummy mixture, the elastomer was loaded and masticated for 1 minute. Carbon black pre-blended with coupling agent (Si 69 if any) was then added. After mixing for an additional 2.5 minutes, or when the temperature reached to about 160° C., the oil was added. The stage 1 masterbatch was then dumped from the mixer at seven minutes total. This was then passed through an open mill three times and stored at room temperature for two hours. In the second stage, the mixing chamber temperature was set to 80° C. and the rotor speed was set at 60 rpm. After the mixer was conditioned to 100° C. by heating the chamber with a dummy mixture, the masterbach from first stage was loaded and masticated for 1 minute, then zinc oxide and stearic acid were added. Flexzone 7P and wax (Sunproof Improved) were added one minute later. In the last stage, the mixing chamber temperature was set to 80° C. and the rotor speed was set to 35 rpm. After the mixer was conditioned the masterbatch from stage two was loaded and mixed for one minute. The curative package (including sulfur and accelerators) was then added. The material was dumped from the mixer at two minutes and passed through the open mill three times.

Batches of the compounds were prepared as described for the carbon blacks in the previous Example. The conventional carbon black N234 was used as a control. After mixing, each of the elastomeric compositions was cured at 145° C. to an optimum cure state according to measurements made with a Monsanto ODR Rheometer.

Example 3
Dynamic Hysteresis and Abrasion Resistance

The dynamic hysteresis and abrasion resistance rates were measured for the elastomeric compositions produced according to Example 2 above.

Abrasion resistance was determined using an abrader, which is based on a Lambourn-type machine as described in U.S. Pat. No. 4,995,197, hereby incorporated by reference. The tests were carried out at 14% slip. The percentage slip is determined based on the relative velocities of a sample wheel and a grindstone wheel. The abrasion resistance index is calculated from the mass loss of the elastomeric compound. Dynamic properties were determined using a Rheometrics Dynamic Spectrometer II (RDS II, Rheometrics, Inc., New Jersey) with strain sweep. The measurements were made at 0 and 70° C. with strain sweeps over a range of double strain amplitude (DSA) from 0.2 to 120%. The maximum tan δ values on the strain sweep curves were taken for comparing the hysteresis among elastomeric compounds.

TABLE 4

|  | tan δ @ 0° C. | tan δ @ 70° C. | Abrasion Index @ 14% |
|---|---|---|---|
| Duradene 715/BR |  |  |  |
| N234 | 0.451 | 0.225 | 100 |
| A1-CB1 | 0.369 | 0.139 | 85.0 |
| A1-CB2 | 0.407 | 0.184 | 93.2 |
| A1-CB3 | 0.399 | 0.173 | 99.3 |
| A1-CB4 | 0.393 | 0.160 | 88.4 |
| NS116/BR |  |  |  |
| N234 | 0.448 | 0.241 | 100 |
| A1-CB1 | 0.410 | 0.129 | 83.4 |
| A1-CB2 | 0.451 | 0.177 | 101.1 |
| A1-CB3 | 0.447 | 0.157 | 93.9 |
| A1-CB4 | 0.431 | 0.154 | 89.5 |

Figure 2:
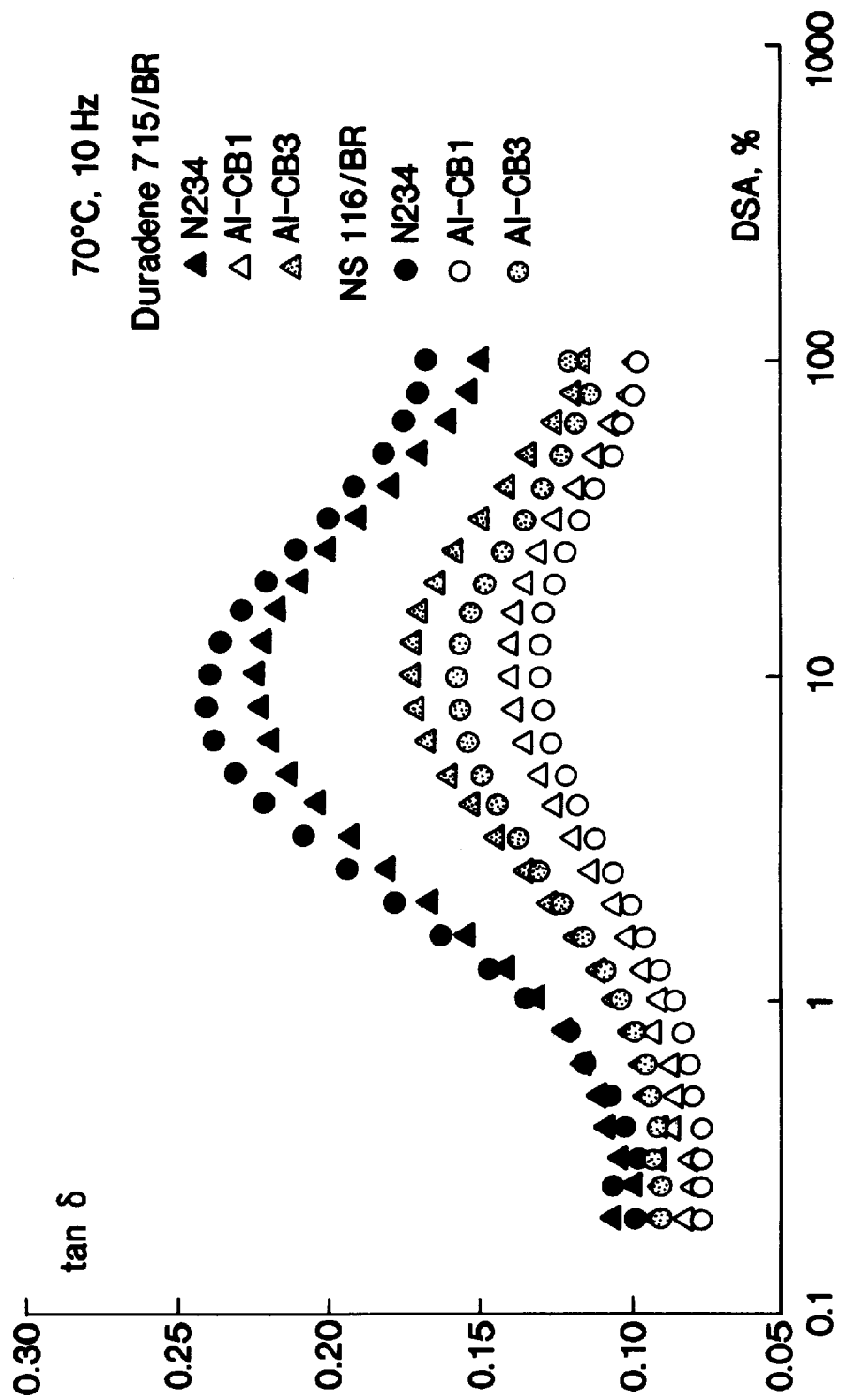
FIG. 2 is a graph demonstrating hysteresis values at different strains at 70° C. on elastomeric compositions of the present invention.

As seen in Table 4 above and in FIG. 2, tan δ values at 70° C. were reduced by 18.2~38.2% for Duradene 715/BR system, and 26.6~46.5% for NS116/BR polymer systems, while tan δ values at 0° C. were reduced by 11.0~18.2% for Duradene 715/BR compounds and −0.7~8.4% for NS116/BR compounds. For abrasion resistance, compared with N234, the maximum reduction is found for aluminum-treated carbon black for AB-CB1 with a values of 15% and 16.6% in Duradene 715/BR and NS116/BR systems, respectively. AB-CB2 and AB-CB3 show a comparable abrasion resistance to the traditional carbon black.

All patents, patent applications, test methods, and publications mentioned herein are incorporated by reference.

Many variations of the present invention will suggest themselves to those skilled in the art in light of the above detailed disclosure. For example, the compositions of the present invention may include other reinforcing agents, other fillers, oil extenders, antidegradants, and the like. All such modifications are within the full intended scope of the claims.

What is claimed is:

1. An elastomeric compound comprising an elastomer and aggregate comprising a carbon phase and a metal-containing species phase.

2. The elastomeric compound of claim 1, wherein said metal-containing species comprises a magnesium-containing species phase, a calcium-containing species phase, a titanium-containing species phase, a vanadium-containing species phase, a cobalt-containing species phase, a nickel-containing species phase, a zirconium-containing species phase, a tin-containing species phase, an antimony-containing species phase, a chromium-containing species phase, a neodymium-containing species phase, a lead-containing species phase, a tellurium-containing species phase, a barium-containing species phase, a cesium-containing species phase, an iron-containing species phase, a molybdenum-containing species phase, or mixtures thereof.

3. The elastomeric compound of claim 1, wherein said metal-containing species phase comprises an aluminum-containing species phase.

4. The elastomeric compound of claim 1, wherein said metal-containing species phase comprises a zinc-containing species phase.

5. The elastomeric compound of claim 1, further comprising a coupling agent.

6. The elastomeric compound of claim 1, wherein said metal-containing species phase exists primarily at the surface of the metal-treated carbon black aggregate.

7. The elastomeric compound of claim 1, wherein said metal-containing species phase is distributed throughout the metal-treated carbon black aggregate.

8. The elastomeric compound of claim 1, wherein said elastomer comprises solution SBR, natural rubber, functional solution SBR, emulsion SBR, polybutadiene, polyisoprene, or blends thereof.

9. The elastomeric compound of claim 1, further comprising a filler.

10. The elastomeric compound of claim 1, wherein said metal-containing species phase is oxidized.

11. The elastomeric compound of claim 1, further comprising carbon black, silica, carbon black having an organic group attached thereto, silicon-treated carbon black or combinations thereof.

12. The elastomeric compound of claim 1, wherein at least a portion of said metal-treated carbon black aggregate has an organic group attached thereto, and optionally treated with a silane coupling agent.

13. The elastomeric compound of claim 1, further comprising a carbon black having an organic group attached thereto.

14. The elastomeric compound of claim 1, further comprising carbon black.

15. The elastomeric compound of claim 1, wherein a portion of said metal-treated carbon black aggregate has an organic group attached thereto and said elastomeric compound further comprises a carbon black having an organic group attached thereto, silica, carbon black, or mixtures thereof.

16. The elastomeric compound of claim 1 wherein said metal-treated carbon black metal-containing species phase comprises from about 0.1% to about 25% elemental metal, by weight of said aggregate.

17. The elastomeric compound of claim 16, wherein said metal-treated carbon black metal-containing species comprises from about 0.5% to about 10% elemental metal, by weight of said aggregate.

18. The elastomeric compound of claim 17, wherein said metal-treated carbon black metal-containing species phase comprises from about 2% to about 6% elemental metal, by weight of said aggregate.

19. The elastomeric compound of claim 5, wherein said coupling agent comprises a silane coupling agent, a zirconate coupling agent, a titanate coupling agent, a nitro coupling agent or a mixture thereof.

20. The elastomeric compound of claim 5, wherein said coupling agent comprises bis(3-triethoxysilylpropyl) tetrasulfane, 3-thiocyanatopropyl-triethoxy silane, γ-mercaptopropyl-trimethoxy silane, zirconium dineoalkanolatodi(3-mercapto)propionato-O, N,N'-bis(2-methyl-2-nitropropyl)-1,6-diaminohexane or mixtures thereof.

21. The elastomeric compound of claim 5, wherein said coupling agent comprises from about 0.1 to about 15 parts per hundred of elastomer.

22. An elastomeric compound comprising an elastomer and a metal-treated carbon black aggregate comprising a carbon phase and metal-containing species phase, wherein said elastomer comprises ethylene propylene diene monomer rubber, poly chloroprene, natural rubber, polyisoprene, hydrogenated nitrile butadiene rubber, nitrile butadiene rubber, chlororinated polyethylene, styrene butadiene rubber, butyl rubber, polyacrylic rubber, polyepichlorohydrin, ethylene vinyl acetate, or blends thereof.

23. The elastomeric compound of claim 22, wherein said metal-treated carbon black aggregate comprises from about 10 to about 300 parts per hundred parts of said elastomer.

24. The elastomeric compound of claim 23, wherein said metal-treated carbon black aggregate comprises from about 100 to about 200 parts per hundred parts of said elastomer.

25. The elastomeric compound of claim 24, wherein said metal-treated carbon black aggregate comprises from about 10 to about 150 parts per hundred parts of said elastomer.

26. The elastomeric compound of claim 25, wherein said metal-treated carbon black aggregate comprises about 20 to about 80 parts per hundred parts of said elastomer.

27. An article of manufacture formed from the elastomeric compound of claim 22.

28. The elastomeric compound of claim 5 wherein said coupling agent comprises from about 0.1 to about 6 parts per hundred of elastomer.

29. The elastomeric compound of claim 1, wherein said elastomer comprises a homopolymer, a copolymer, or terpolymer.

30. The elastomeric composition of claim 1, wherein said elastomer has a glass transition point, as measured by DSC, of less than 20° C.

31. The elastomeric composition of claim 30, wherein said elastomer has a glass transition point, as measured by DSC, of between −120° C. and 0° C.

32. The elastomeric compound of claim 1, wherein said metal-treated carbon black aggregate further comprises a silicon-containing species phase.

33. The elastomeric compound of claim 1, wherein said metal-treated carbon black aggregate comprises at least two different metal-containing species phases.

34. The elastomeric compound of claim 1, wherein said metal-treated carbon black aggregate further comprises a boron-containing species phase.

* * * * *